United States Patent
Lee et al.

(10) Patent No.: US 8,108,568 B2
(45) Date of Patent: Jan. 31, 2012

(54) UNIVERSAL PLUG AND PLAY BASED NETWORK SYSTEM AND METHOD OF CONTROLLING THE SAME

(75) Inventors: Jun Seung Lee, Seongnam-si (KR); Jong Sub Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 11/849,525

(22) Filed: Sep. 4, 2007

(65) Prior Publication Data

US 2008/0091847 A1    Apr. 17, 2008

(30) Foreign Application Priority Data

Oct. 17, 2006    (KR) .................. 10-2006-0100835

(51) Int. Cl.
*G06F 3/00*   (2006.01)
*G06F 5/00*   (2006.01)
(52) U.S. Cl. ................. 710/16; 710/8; 710/50
(58) Field of Classification Search ............... 710/8, 50, 710/16
See application file for complete search history.

(56) References Cited

U.S. PATENT DOCUMENTS

| | | | |
|---|---|---|---|
| 2004/0167974 A1* | 8/2004 | Bunn et al. | 709/223 |
| 2007/0115996 A1* | 5/2007 | Shitano et al. | 370/392 |
| 2007/0136491 A1* | 6/2007 | Di et al. | 709/238 |
| 2008/0008444 A1* | 1/2008 | Hori | 386/83 |
| 2008/0289009 A1* | 11/2008 | Lee et al. | 726/4 |

FOREIGN PATENT DOCUMENTS

| | | |
|---|---|---|
| CN | 1612099 A | 5/2005 |
| JP | 2005-309617 | 11/2005 |

OTHER PUBLICATIONS

Wikipedia—"Universal_Plug_and_Play", Sep. 13, 2006, http://web.archive.org/web/20060913000000/en.wikipedia.org/wiki/Universal_Plug_and_Play.*
Chinese Office Action issued Jan. 29, 2010 in CN Application No. 200710151845.
Yuling Wang, "Research and Realization of the Home Network Middleware Technology UPnP", Master dissertation of University of Electronic Science and Technology of China, Dec. 16, 2003, pp. 19-36.
CN Office Action issued Jun. 9, 2011 in CN Patent Application No. 200710151845.0.

* cited by examiner

*Primary Examiner* — Alford W. Kindred
*Assistant Examiner* — Farley Abad
(74) *Attorney, Agent, or Firm* — Stanzione & Kim, LLP

(57) ABSTRACT

A universal plug and play (UPnP)-based network system and a method of controlling the same. A UPnP device can operate according to a description of each control point (CP) when performing a command, by including the description, which is inherent information of each CP, in a command message transmitted from each CP to the UPnP device and allowing the UPnP device to analyze the command message to obtain the description of the CP. The UPnP-based network system includes a plurality of CPs, each of which stores a CP description, which is inherent characteristic information of each CP, and generates and transmits a command message including the CP description, and a UPnP device which is connected to the plurality of CPs over a network, analyzes the command message received from each CP to perform an operation according to the command message, and analyzes the CP description included in the command message to recognize each CP which transmits the command message.

19 Claims, 5 Drawing Sheets

FIG. 3

| CONTROL POINT NAME | SAMSUNG – D – TV |
|---|---|
| PRODUCT NAME | PAVV51L |
| CONTROL POINT DEVICE TYPE | DIGITAL TV |
| URL Address | HTTP://123.456.789.101 |
| LOCATION | ROOM502 |
| MANUFACTUREA | SAMSUNG |
| PRODUCT S/N | SN1234567890 |
| ……. | ……. |
| CONTROL POINT DESCRIPTION ||

FIG. 4

| CONTROL POINT DEVICE TYPE | SCREEN TO BE DISPLAYED UPON OUTPUT OPERATION |
|---|---|
| PC | PC_PRINTING.JPG |
| DIGITAL TV | D-TV_PRINTING.JPG |
| MOBILE PHONE | MOBILE_PRINTING.JPG |
| DEFAULT | DEFAULT_PRINTING.JPG |

FIG. 5

| LOCATION | OUTPUT ALLOWANCE RANGE |
|---|---|
| ROOM - 508 | MULTI-COLOR OUTPUT |
| ROOM - 510 | OUTPUT DISALLOWANCE |
| DEFAULT | MONOCHROME OUTPUT |

UNIVERSAL PLUG AND PLAY BASED NETWORK SYSTEM AND METHOD OF CONTROLLING THE SAME

CROSS-REFERENCE TO RELATED APPLICATIONS

This application claims the benefit of Korean Patent Application No. 2006-100835, filed on Oct. 17, 2006 in the Korean Intellectual Property Office, the disclosure of which is incorporated herein in its entirety by reference.

BACKGROUND OF THE INVENTION

1. Field of the Invention

The present general inventive concept relates to a Universal Plug and Play (UPnP)-based network system, and, more particularly, to a UPnP-based network system including control points to control an operation of a UPnP device to perform the operation by a command of each of the control points, and a method of controlling the same.

2. Description of the Related Art

Recently, in home or offices, peripheral devices, such as scanners, multifunctional devices or printers, are connected to a host device through a local area network (LAN) so as to allow a plurality of users to share the peripheral devices.

Such a network environment, a Universal Plug and Play (hereinafter, referred to as UPnP) technology has come into the spotlight as a standard of a technology for mutually operating the devices. Many devices have already used the UPnP technology.

In the UPnP technology, for example, a UPnP device for supporting the UPnP operates according to a command message generated by a control point (hereinafter, referred to as CP) which acts as a host device through a network. The CP is indicative of the host device, such as a computer, a television set, a video cassette recorder (VCR), a refrigerator, a microwave oven or a washing machine.

The CP generates the command message using inherent information of the UPnP device, but the UPnP device operates only using the command message, without distinguishing the CP from other CPs. That is, it is impossible to determine which one of CPs generates and transmits the command message to perform a current operation.

Accordingly, when the UPnP device is a printer, the UPnP printer cannot display information as to whether the command message is output from a digital television set or a personal computer on a liquid crystal display (LCD) of the printer. Even when the command message is output from a neighboring house included in the same network, the UPnP printer operates without distinguishing the CP. This is because means for checking which CP outputs the current command message is not included in the UPnP printer.

SUMMARY OF THE INVENTION

The present general inventive concept provides a UPnP-based network system, which is capable of allowing a UPnP device to use CP information when the UPnP device operates according to a command by transmitting the CP information as well as the command from a CP to the UPnP device, and a method of controlling the same.

Additional aspects and/or advantages of the present general inventive concept will be set forth in part in the description which follows and, in part, will be obvious from the description, or may be learned by practice of the general inventive concept.

The above and/or other aspects of the present general inventive concept can be achieved by providing a Universal Plug and Play (UPnP)-based network system including a plurality of control points (CPs), each of which stores a CP description, which is inherent characteristic information of each CP, and generates and transmits a command message including the CP description, and a UPnP device which is connected to the plurality of CPs through a network, analyzes the command message received from each CP to perform an operation according to the command message, and analyzes the CP description included in the command message to recognize one of the CPs which transmits the command message.

Each of the plurality of CPs may include a device description analysis unit which receives a device description, which is inherent characteristic information of the UPnP device, from the UPnP device and analyzes which function the UPnP device performs, a user operation unit which allows a user to input information for generating the command message, a CP description storage unit which stores the CP description, a command message generation unit which generates the command message including the CP description and the information input by the user so as to operate the UPnP device according to the analyzed device description, and a data transmission/reception unit which receives the device description from the UPnP device and transmits the command message generated by each of the plurality of CPs to the UPnP device.

The UPnP device may include a device description storage unit which stores the device description, a command message analysis unit which analyzes the command message received from each of the plurality of CPs, a CP description analysis unit which analyzes the CP description included in the analyzed command message; an additional information storage unit which stores additional information for controlling an additional operation corresponding to each of the CPs, an output control unit which searches for and acquires the additional information corresponding to the analyzed CP description and outputs a command obtained by combining the acquired additional information and the analyzed command message, an output operation unit which performs the operation according to a control signal of the output control unit, and a data transmission/reception unit which transmits the device description to each CP and receives the command message generated by each of the plurality of CPs.

Each of the plurality of CPs may generate the command message including CP description position information indicating a storage position of the CP description.

Each of the plurality of CPs may generate the command message including the CP description.

The UPnP device may be a UPnP printer.

The foregoing and/or other aspects of the present general inventive concept may also be achieved by providing a method of controlling a Universal Plug and Play (UPnP)-based network system including a plurality of control points (CPs) each of which transmits a command message to operate a UPnP device which is connected to the plurality of CPs through a network to receive the command message and perform an operation, the method including generating the command message including a CP description which is inherent characteristic information of each CP at each of the plurality of CPs, receiving the generated command message and analyzing the CP description included in the command message at the UPnP device, searching for previously stored additional information corresponding to the analyzed CP description, and performing an operation corresponding to the searched additional information when performing an operation required by the command message.

The foregoing and/or other aspects of the present general inventive concept may also be achieved by providing a method of controlling a Universal Plug and Play (UPnP)-based network system including a plurality of control points (CPs) to operate a UPnP device which is connected to the plurality of CPs through a network to receive the command message and perform an operation, the method including generating the command message including CP description position information indicating a storage position of a CP description which is inherent characteristic information of each CP at each of the plurality of CPs, receiving the generated command message and receiving the CP description stored in the storage position indicated by the CP description position information included in the command message at the UPnP device, analyzing the received CP description, searching for previously stored additional information corresponding to the analyzed CP description, and performing an operation corresponding to the searched additional information when performing an operation required by the command message.

The foregoing and/or other aspects of the present general inventive concept may also be achieved by providing a universal plug and play (UPnP)-based network system including a control point to store a CP description and to transmit a command message together with the CP description to an external UPnP device, so that the external UPnP device performs an operation according to the command message and recognizes the control point sending the command message.

The control point may receive a device description, which is inherent characteristic information of the external UPnP device, from the UPnP device, analyze which function of the UPnP device performs according to the device description, and generate the CP description according to the analyzed function of the UPnP device.

The UPnP device may include a UPnP printer, and the device description may include a description of the UPnP printer.

The control point may include a user operation unit through which information to generate the command message is input, a CP description storage unit to store the CP description, a command message generation unit to generate the command message including the CP description and the input information so as to operate the UPnP device, and a data transmission/reception unit to transmit the command message to the UPnP device.

The information to generate the command message may include one or more attribute values of the command message to perform the operation in the external UPnP device.

The control point may generate the command message including CP description position information to indicate a storage position of the CP description.

The CP description may include at least one of a control point name, a product name, a control point device name, a URL address, a location, a manufacturer, and a product serial number.

The foregoing and/or other aspects of the present general inventive concept may also be achieved by providing a universal plug and play (UPnP)-based network system including a UPnP device to receive a command message including a CP description from the external control point and to perform an operation according to the command message and to recognize the external control point according to the CP description.

The UPnP device may generate a device description to the external control point so that the external control point generates the command message according to the device description.

The device description may include inherent characteristic of the UPnP device.

The device description may include one or more services to be performed in the UPnP device.

The device description may include one or more operable commands to perform one or more operations in the UPnP device.

The UPnP device may store additional information on the external control point and transmit the device description to the external control point according to the stored additional information.

The additional information may include one or more image files corresponding to a type of the external control point.

The additional information may include a screen size to be displayed on a display according to a type of the external control point.

The additional information may include an output allowance option corresponding to a location of the external control point.

The operation may include a printing operation to print an image according to data transmitted from the external control point.

The foregoing and/or other aspects of the present general inventive concept may also be achieved by providing a method of a universal plug and play (UPnP)-based network system, the method including storing a CP description about a control point, and transmitting a command message with the CP description to an external UPnP device, so that the external UPnP device performs an operation according to the command message and recognizes the control point sending to command message.

The foregoing and/or other aspects of the present general inventive concept may also be achieved by providing a method of a universal plug and play (UPnP)-based network system, the method including receiving a command message including a CP description of an external control point from the external control point, performing an operation according to the command message, and recognizing the external control point according to the CP description.

The foregoing and/or other aspects of the present general inventive concept may also be achieved by providing a computer readable recording medium containing computer readable codes as a program to execute a method of a universal plug and play (UPnP)-based network system, the method including storing a CP description about a control point, and transmitting a command message with the CP description to an external UPnP device, so that the external UPnP device performs an operation according to the command message and recognizes the control point sending to command message.

The foregoing and/or other aspects of the present general inventive concept may also be achieved by providing a computer readable recording medium containing computer readable codes as a program to execute a method of a universal plug and play (UPnP)-based network system, the method comprising: receiving a command message including a CP description of an external control point from the external control point, performing an operation according to the command message, and recognizing the external control point according to the CP description.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 is a view illustrating an example of information which may be included in a CP description stored in a CP description storage unit;

FIG. 4 is a view illustrating an example of additional information stored in an additional information storage unit shown in FIG. 1; and FIG. 5 is a view illustrating another example of the additional information stored in the additional information storage unit shown in FIG. 1.

DETAILED DESCRIPTION OF THE PREFERRED EMBODIMENTS

Figure 1:
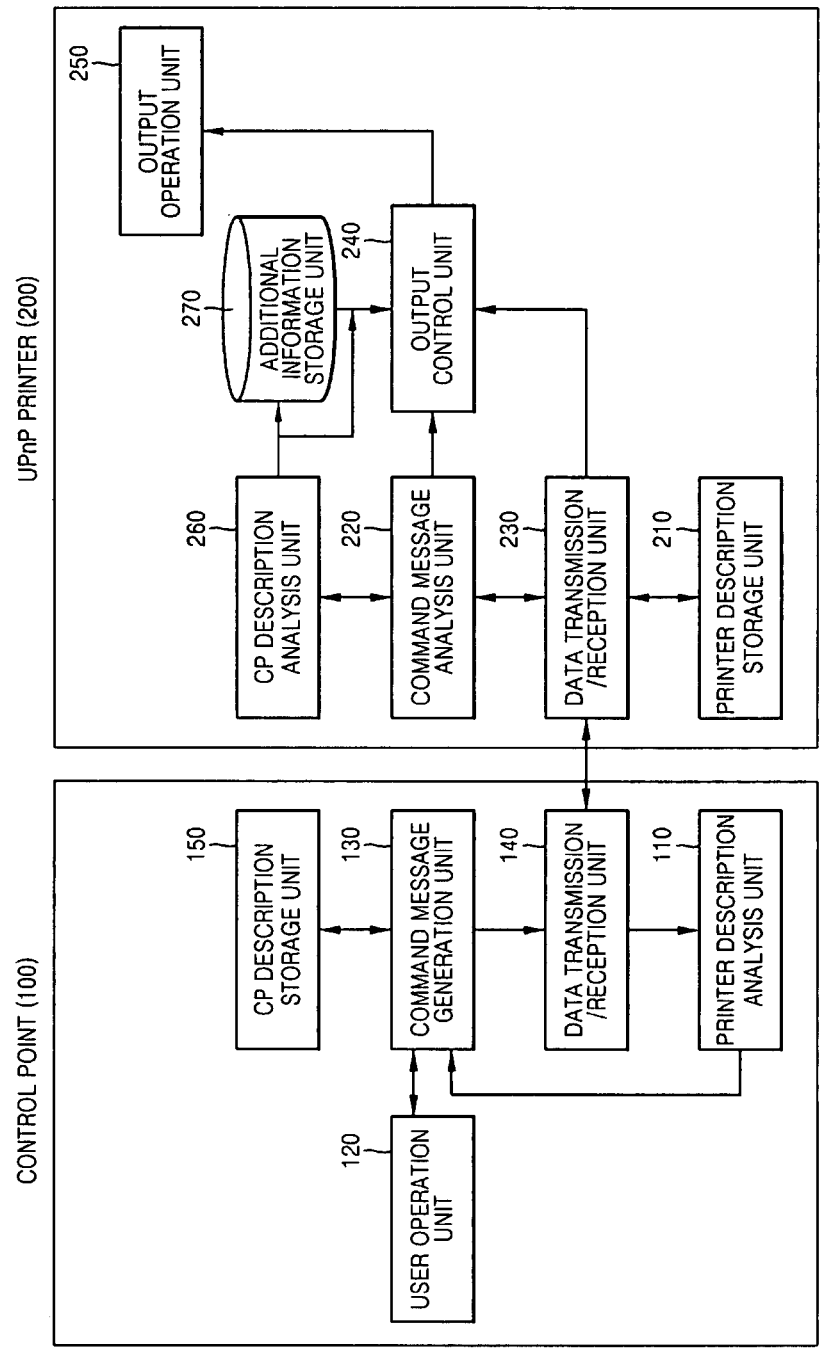
FIG. 1 is a block diagram illustrating a UPnP-based network system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Hereinafter, a case where a UPnP device is a printer will be described as a preferred embodiment.

FIG. 1 is a block diagram illustrating a UPnP-based network system according to an embodiment of the present general inventive concept. As illustrated in FIG. 1, the UPnP-based network system according to the embodiment of the present general inventive concept includes a CP 100 to transmit a command message to control a UPnP printer, and the UPnP printer 200 connected to the CP 100 through a network, to receive the command message from the CP 100, and to perform an output operation according to the received command message. The network may be a wire or wireless network.

The CP 100 includes a printer description analysis unit 110, a user operation unit 120, a command message generation unit 130, a data transmission/reception unit 140, and a CP description storage unit 150.

The printer description analysis unit 110 receives a description of the UPnP printer 200 from the UPnP printer 200 and analyzes a function to be performed in the UPnP printer 200.

The user operation unit 120 allows a user to input an attribute value to generate the command message.

The command message generation unit 130 generates the command message according to a service which can be provided by the UPnP printer 200 and prepares the command message including a description indicating inherent characteristic information of the CP 100. That is, the command message generation unit 130 analyzes an action (operation) to be supported or performed in the UPnP printer 200 via the printer description received from the UPnP printer 200 and generates the command message to perform a desired action. The command message includes information (image data information or the like) input by the user, and CP information.

The data transmission/reception unit 140 transmits and/or receives information to and/or from the UPnP printer 200, that is, receives the printer description from the UPnP printer 200 and transmits the command message generated in the CP 100 to the UPnP printer 200. In addition to the command message, the data transmission/reception unit 140 also transmits print data to the UPnP printer 200 to print an image on a printing medium according to the print data.

The CP description storage unit 150 stores the description which is the inherent characteristic information of the CP, that is, stores information on a device including the CP 100.

The UPnP printer 200 includes a printer description storage unit 210, a command message analysis unit 220, a data transmission/reception unit 230, an output control unit 240, an output operation unit 250, a CP description analysis unit 260, and an additional information storage unit 270.

The printer description storage unit 210 stores the description which is inherent information of the UPnP printer 200, such as services (operable commands) provided by the current UPnP printer 200 and the position of the UPnP printer 200.

The command message analysis unit 220 receives and analyzes the command message transmitted from the CP 100, extracts the CP information from the command message, and sends the CP information to the CP description analysis unit 260.

The data transmission/reception unit 230 receives the command message and the print data transmitted from the CP 100 and the sends the command message and the print data to the output control unit 240. The data transmission/reception unit 230 further transmits the printer description to the CP 100.

The output control unit 240 determines an operation method by combining the command message analyzed by the command message analysis unit 220, the print data, and additional information associated with the CP acquired via the additional information storage unit 270 and outputs a command to the output operation unit 250.

The output operation unit 250 performs an actual output operation, such as printing, according to the command of the output control unit 240. The actual output operation may include printing an image using a printing unit or displaying an identity of the CP 100 according to the CP description on a display unit of the UPnP printer 200

The CP description analysis unit 260 analyzes the CP description received from the command message analysis unit 220.

The additional information storage unit 270 stores the additional information which varies according to the CP 100. The additional information may be, for example, image information to be displayed on a liquid crystal display (LCD) upon the output operation, output disallowance according to a CP name, identification information or a location or the like, according to the type of the CP. The additional information may be stored in different forms using the CP description, in accordance with the service provided by the UPnP printer 200.

The present embodiment may include four operations of, at the CP 100, generating the command message including the CP description, at the UPnP printer 200, receiving the command message and analyzing the CP description, at the UPnP printer 200, searching for the previously stored additional information corresponding to the analyzed CP description, and, at the UPnP printer 200, applying the searched additional information to the output operation.

Figure 2:
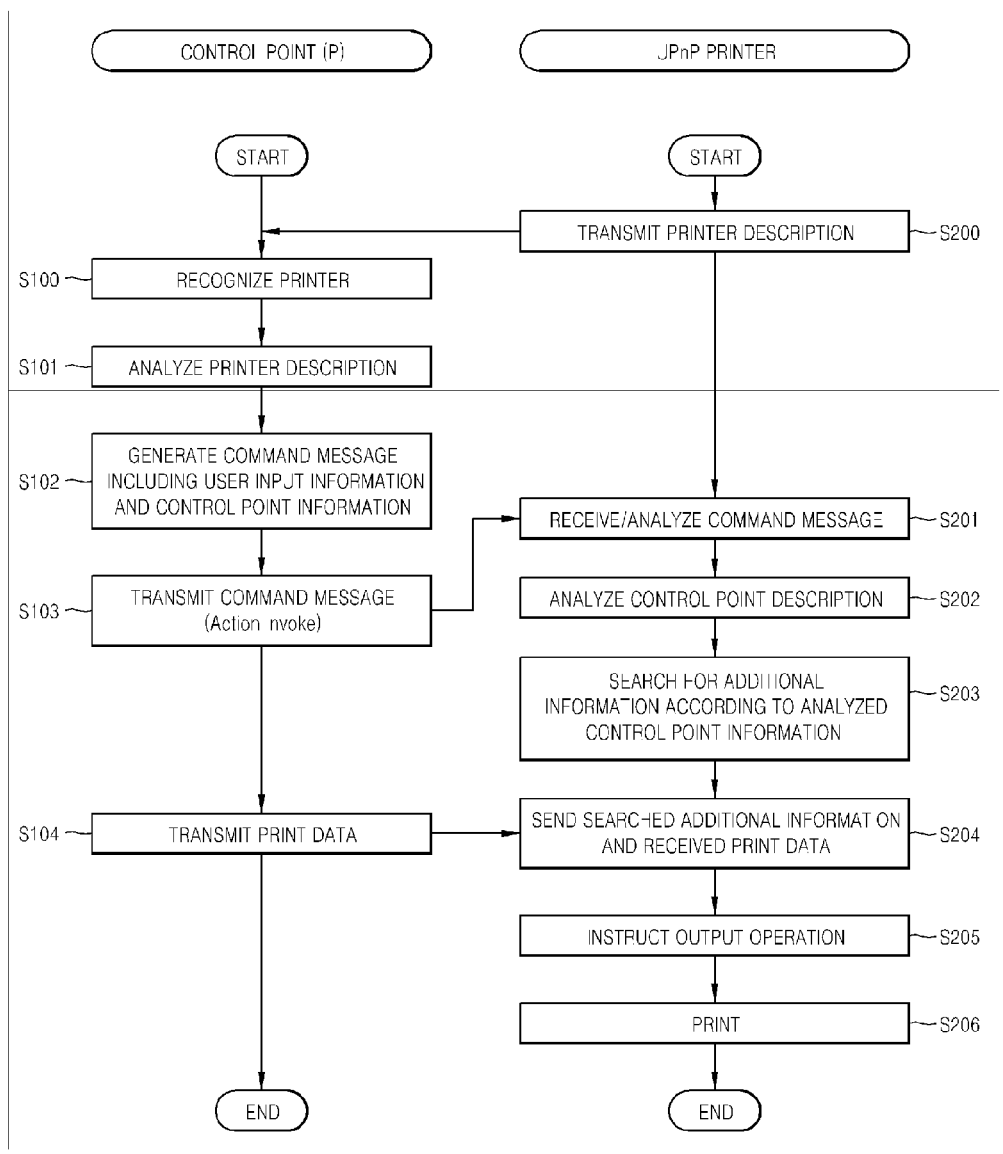
FIG. 2 is a flowchart illustrating an operation of a UPnP-based network system according to the embodiment of the present general inventive concept.

FIG. 2 is a flowchart illustrating an operation of a UPnP-based network system according to the embodiment of the present general inventive concept.

Hereinafter, the operation illustrated in FIG. 2 will be described with reference to FIG. 1.

The CP 100 performs generating the command message including the CP description (S200, S100, S101 and S102), and the UPnP printer 200 connected to the CP over the network transmits the description of the UPnP printer 200 in operation S200. The CP 100 receives the description of the UPnP printer 200, recognizes the UPnP printer 200 at operation S100, and analyzes the description of the UPnP printer 200 at operation S101. That is, the CP 100 determines which type of the UPnP printer 200 is used and which action is provided by the analysis of the description of the UPnP printer 200. The CP 100 determines the type of the command message by the analysis of the description of the UPnP printer 200 and generates the command message including information input by the user and the CP description in operation S102. As illustrated in FIG. 3, for example, the CP description includes a CP name, a product name, a URL address, a location, a manufacturer, and a product serial number (S/N). The CP transmits the generated command message to the UPnP printer 200 in operation S103.

The UPnP printer 200 performs receiving the command message and analyzing the CP description (S201 and S202), and the UPnP printer 200 analyzes the command message received from the CP in operation S201, and extracts and analyzes the CP description to obtain the inherent information on the device including the CP in operation S202.

The UPnP printer 200 performs searching for the previously stored additional information corresponding to the analyzed CP description (S203). That is, the UPnP printer 200 searches for the additional information corresponding to the analyzed CP description in the additional information stored in the additional information storage unit 270 in operation S203. That is, the UPnP printer 200 searches for the additional information necessary for the output operation, which is stored in the additional information storage unit 270, using the CP description analyzed by the CP description analysis unit. The UPnP printer 200 sends the searched additional information and the print data received from the CP 100 to the output control unit 240 in operation S204. As illustrated in FIG. 4, for example, the additional information may be stored in forms of respective image files (PC_Printing.jpg, D-TV_Printing.jpg, Mobile_Printing.jpg, Default_Printing.jpg) corresponding to the types of the CPs (PC, Digital TV, Mobile phone and Default) such that different screens can be displayed upon the output operation according to the type of the CP simultaneously, sequentially, or separately. Alternatively, as illustrated in FIG. 5, in a lodging using one network, if an output service is provided using each CP provided in each room, the additional information may be stored in forms of respective output allowance options (multi-color output, output disallowance and monochrome output) corresponding to the locations of the CPs (Room501-508, Room509-510 and Default) such that the output can be restricted according to a lodging charge. The additional information storage method is only an example of using the description of the CP and other methods may be used.

The UPnP printer 200 performs applying the searched additional information to the output operation (S204, S205 and S206). That is, the UPnP printer 200 receives the print data from the CP 100, combines the received print data, the basic attribute values of the output operation included in the command message and the searched additional information, and controls the output operation in operations S204 to S206. That is, the print operation required by the command message is performed, and an operation corresponding to the searched additional information is simultaneously performed when the print operation is performed.

Although a printer to support the UPnP is described in the above-described embodiment, the present general inventive concept is not limited to the printer and may apply to all UPnP devices requiring CP information.

Although the CP directly transmits the CP description to the UPnP device by including CP description in the command message when the CP transmits the command message to the UPnP device in the above-described embodiment, the present invention is not limited to the above-described embodiment. By including only CP description position information indicating the storage position of the CP description in the command message transmitted from the CP to the UPnP device, the CP may transmit only the CP description position information to the UPnP device and the UPnP device may receive the CP description stored in the CP from the CP according to the CP description position information.

As described above, according to the present invention, a UPnP device can operate in conformity with a description of each CP when performing a command, by including the description, which is inherent information of each CP, in a command message transmitted from each CP to the UPnP device and allowing the UPnP device to analyze the command message to obtain the description of the CP.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

According to the present embodiment, the UPnP device can obtain the CP description such as device information, identification information, manufacturer information, location information and perform a variety of additional operations in conformity with each CP. In addition, since a restriction varies according to an actual operation, a variety of services can be provided.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A universal plug and play (UPnP)-based network system comprising:

a first control point (CP) to store a first CP description and to transmit a first command message together with a first CP description position information to an external UPnP device, so that the external UPnP device performs an operation according to the first command message and recognizes the first control point sending the first command message, wherein the first control point generates the first command message including the first CP description position information to indicate a storage position of the first CP description, and wherein the UPnP device operates according to the first command message from the first control point and distinguishes the first control point from a second control point that transmits a second command message with a second CP description position information to the external UPnP device by receiving the first CP description stored in the first CP from the first CP according to the first CP description position information and a second CP description stored in the second CP according to the second CP description position information.

2. The UPnP-based network system according to claim 1, wherein the first control point receives a device description, which is inherent characteristic information of the external UPnP device, from the UPnP device, analyzes which function of the UPnP device performs according to the device description, and generates the first CP description according to the analyzed function of the UPnP device.

3. The UPnP-based network system according to claim 2, wherein the UPnP device comprises a UPnP printer, and the device description comprises a description of the UPnP printer.

4. The UPnP-based network system according to claim 1, wherein the first control point comprises:
   a user operation unit through which information to generate the first command message is input;
   a CP description storage unit to store the first CP description;
   a command message generation unit to generate the first command message including the first CP description position information and the input information so as to operate the UPnP device; and
   a data transmission/reception unit to transmit the first command message to the UPnP device.

5. The UPnP-based network system according to claim 4, wherein the information to generate the first command message comprises one or more attribute values of the first command message to perform the operation in the external UPnP device.

6. The UPnP-based network system according to claim 1, wherein the first CP description comprises at least one of a control point name, a product name, a control point device name, a URL address, a location, a manufacturer, and a product serial number.

7. A universal plug and play (UPnP)-based network system comprising:
   a UPnP device to receive a first command message including a first control point (CP) description position information from a first control point and to perform an operation according to the first command message and to recognize the first control point according to a first CP description,
   wherein the first command message received by the UPnP device includes the first CP description position information to indicate a storage position of the first CP description, and
   wherein the UPnP device distinguishes the first control point from a second control point that transmits a second command message with a second CP description position information to the UPnP device by receiving the first CP description stored in the first CP from the first CP according to the first CP description position information and a second CP description stored in the second CP according to the second CP description position information.

8. The UPnP-based network system according to claim 7, wherein the UPnP device generates a device description to the first control point so that the first control point generates the command message according to the device description.

9. The UPnP-based network system according to claim 8, wherein the device description comprises inherent characteristic of the UPnP device.

10. The UPnP-based network system according to claim 8, wherein the device description comprises one or more services to be performed in the UPnP device.

11. The UPnP-based network system according to claim 8, wherein the device description comprises one or more operable commands to perform one or more operations in the UPnP device.

12. The UPnP-based network system according to claim 8, wherein the UPnP device stores additional information on the first control point and transmits the device description to the first control point according to the stored additional information.

13. The UPnP-based network system according to claim 8, wherein the additional information comprises one or more image files corresponding to a type of the first control point.

14. The UPnP-based network system according to claim 8, wherein the additional information comprises a screen size to be displayed on a display according to a type of the first control point.

15. The UPnP-based network system according to claim 8, wherein the additional information comprises an output allowance option corresponding to a location of the first control point.

16. The UPnP-based network system according to claim 7, wherein the operation comprises a printing operation to print an image according to data transmitted from the first control point.

17. A method of a universal plug and play (UPnP)-based network system, the method comprising:
   storing a first control point (CP) description about a first control point; and
   transmitting a first command message with a first CP description position information to an external UPnP device, so that the external UPnP device performs an operation according to the first command message and recognizes the first control point sending the first command message,
   wherein the transmitted first command message includes the first CP description position information to indicate a storage position of the first CP description, and
   wherein the external UPnP device distinguishes the first control point from a second control point that transmits a second command message with a second CP description position information to the external UPnP device by receiving the first CP description stored in the first CP from the first CP according to the first CP description position information and a second CP description stored in the second CP according to the second CP description position information.

18. A method of a universal plug and play (UPnP)-based network system, the method comprising:
   receiving a command message including a first control point (CP) description position information of a first external control point from the first external control point;
   performing an operation according to the first command message; and
   recognizing the first external control point according to a first CP description,
   wherein the received first command message includes the first CP description position information to indicate a storage position of the first CP description, and
   wherein the UPnP device distinguishes the first external control point from a second control point that transmits a second command message with a second CP description position information to the UPnP device by receiving the first CP description stored in the first external CP from the first external CP according to the first CP description position information and a second CP description stored in the second CP according to the second CP description position information.

19. A method of a universal plug and play (UPnP)-based network system that includes a first control point and at least one UPnP device, the method comprising:

transmitting a first command message with a first control point (CP) description position information from the first control point to the UPnP device;

recognizing the first control point transmitting the first command message with the at least one UPnP device; and performing an operation according to the received first command message with the at least one UPnP device that recognized the first control point, wherein the transmitted first command message includes the first CP description position information to indicate a storage position of a first CP description, and wherein the UPnP device distinguishes the first control point from a second control point that transmits a second command message with a second CP description position information to the UPnP device by receiving the first CP description stored in the first CP from the first CP according to the first CP description position information and a second CP description stored in the second CP according to the second CP description position information.

* * * * *